United States Patent Office 2,830,983
Patented Apr. 15, 1958

2,830,983

PREPARATION OF AMINO ALCOHOLS

Raymond U. Lemieux, Ottawa, Ontario, Canada, assignor to National Research Council, Ottawa, Ontario, Canada, a body corporate of Canada No Drawing. Application May 31, 1955
Serial No. 512,293

9 Claims. (Cl. 260—211)

This invention relates to the art of producing amino alcohols and it pertains more particularly to the catalytic liquid phase hydrogenation of aliphatic hydroxy aldehydes or ketones such as the monosaccharides and reducing disaccharides in the presence of hydrazine.

The main object of this invention is the efficient and economical preparation of glycamines and other amino alcohols.

The preparation of glycamines has been the object of many inventions as shown by the U. S. Patents, 2,016,962, 2,621,175 and 2,181,929. In spite of this attention, means for preparing gylcamines in high yield are not available although these materials are in great demand as evidenced by U. S. Patents 2,060,850, 2,060,851, 2,181,929, 2,621,175, 2,396,097, 2,381,952, 2,342,957, 2,274,593, 2,173,056, 2,159,804, 1,994,467 and others. The relative unavailability of the simple glycamines has led to widespread use of N-alkylglycamines which can be prepared in substantially more attractive yield.

The present invention renders possible the preparation of glycamines, in most instances as readily crystallizable products of high purity, with an utmost economy of reagent.

It has been found, in accordance with the present invention, that amino alcohols are readily prepared in high yield by reacting an aqueous solution of a compound selected from the group consisting of aliphatic hydroxy aldehydes and aliphatic hydroxy ketones with hydrazine and subsequently hydrogenating the resultant reaction product.

It has been found in particular that those amino alcohols derived from sugars, namely glycamines are prepared by reacting an aqueous solution of a sugar with hydrazine and subsequently hydrogenating the resulting reaction product. A highly suitable hydrogenation has been the reduction by means of hydrogen employing a nickel catalyst.

The following are examples of the invention:

EXAMPLES 1–7

The seven different sugars shown in the table below for Examples 1 to 7 respectively were reacted according to the present invention as follows:

50 mM of the sugar was dissolved in 50 ml. water and 50 mM of hydrazine was added. The resulting solution was hydrogenated for 6 hours at 100° C. and 1500 p. s. i. of hydrogen in the presence of a finely divided nickel catalyst. The catalyst was subsequently removed by filtration and the aqueous filtrate evaporated in vacuo to a non-reducing dry syrup. It was noted that in most cases the strongly alkaline product solidified to a white powder.

Nitrogen analyses were then performed on this crude white crystalline product, according to the standard Kjeldahl procedure. The product was then examined through the well known procedure of paper chromatography. Paper chromatography uses a piece of absorbent paper as the separation medium. In this process, the material is placed at one corner of a sheet of absorbent paper such as filter paper. A water-saturated solvent is run in one direction down the paper. After drying, a second solvent is run in a direction at right angles to the first. In this way the individual compounds in the sample are spread out over the filter paper at positions depending upon their partition co-efficients between the solvent and the water in the paper. The positions of the various components over the filter paper are then revealed by a colour reaction. In this way, the reaction products were shown to contain mostly the desired primary glycamine, with small amounts of the sugar alcohol and what was in all probability the secondary glycamine.

The glycamines of the Examples 1–3 were then characterised by the preparation of the N-2,4-dinitrophenyl derivatives by well known methods, and by ascertaining the specific rotation of these derivatives. The other glycamines were characterised by the preparation of different derivatives. A summary of the results for these seven sugars tested are given in Table I.

Table I

| Example | Sugar | Product | | N-2,4-dinitrophenyl derivative | | | Addition Tests |
|---|---|---|---|---|---|---|---|
| | | Percent yield | Percent Nitrogen | M. P., °C. | $[\alpha]_D$ | Solvent for $[\alpha]_D$ | |
| 1 | D-glucose | 83 | 6.45 | 165–166 | +12.1 | pyridine | The N-2,4-dinitrophenyl derivative of D-glucamine is reported to melt at 166° C. with $[\alpha]_D$ of +12.8° in water. |
| 2 | D-galactose | 89 | 6.81 | 191.5–192.5 | +11.8 | do | Reported values of N-2,4-dinitrophenyl-D-galactamine, M. P., 195–196° C., $[\alpha]_D$ 7.5° in water. |
| 3 | D-mannose | 89 | 6.92 | 174.5 | −21.4 | do | |
| 4 | D-fructose | 76 | 5.90 | | | | acetylated to 2-deoxy-2-amino-D-mannitol in 17% yield, M. P., 182–183, $[\alpha]_D$ 10.8° in chloroform. |
| 5 | D-xylose | 67 | 6.25 | | | | treated with HI in ethanol to form D-xylamine hydroiodide, in 70% yield, M. P., 205–206. |
| 6 | D-ribose | 95 | 8.76 | | | | treated with acetylacetone to form D-ribaminylacetylacetone in 46% yield, M. P., 118.5–119.5, $[\alpha]_D$ −9° in 0.1 N HCl. |
| 7 | maltose | 97 | 3.97 | | | | Analysed by paper chromatography only. Showed to contain a large amount of D-maltamine. Also small amount of glucamine. |

EXAMPLES 8–11

In these preparations 100 mM of the polyhydroxy aldehydes were dissolved in 100 ml. of water and 100 mM of hydrazine was added. After the addition of finely divided, freshly prepared nickel catalyst, the solution was agitated under a hydrogen pressure of 1,500 lbs. per square inch for two hours at 75° C. Filtration to remove the catalyst gave a colourless solution which on evaporation gave the product described in Table I. The results are summarized in Table II.

*Table II*

| Sugar | Percent Glycamine in Product (by titration) | Specific Rotation in Water, degrees | Melting Point |
|---|---|---|---|
| 8. D-Glucose | 95 | −7.45 | |
| 9. D-Mannose | 81 | +7.05 | 140–155° C. |
| 10. D-Galactose | 88 | +6.3 | 130–142° C. |
| 11. D-Ribose | 84 | −5,65 | oil. |

EXAMPLE 12

An autoclave was charged with 900 gm. of glucose, 5000 ml. of water, 140 gm. of hydrazine and 75 gm. of a freshly prepared nickel catalyst. The mixture was agitated under a hydrogen pressure of 1,500 lbs. per square inch for three hours at 90° C. The product was filtered to remove the catalyst and the filtrate was evaporated in vacuo to a light-brown syrup which soon crystallized, M. P. 120–130° C. without purification and appeared to be 92% glucamine by titration and nitrogen estimation.

In all these examples, the amounts of the sugar and of hydrazine were equimolar. However, it was found that substantial yields could be obtained using 0.5–1.2 moles of hydrazine to 1 mole of sugar. Using amounts of hydrazine greater than 1.2 moles did not increase the yield but merely wasted expensive hydrazine. It is preferred to use from 0.9 to about 1 mole of hydrazine for each mole of sugar.

Catalytic hydrogenation according to the present invention has many different forms. For example the catalyst, temperatures and pressures and time may all be varied and yet accomplish the same result. The catalyst used in the above twelve examples was the finely divided nickel catalyst known as Raney nickel as described in U. S. Patent 1,628,190. However, other nickel catalysts may be used, such as finely divided nickel supported on kieselguhr or on diatomaceous earth. Further other catalysts may be used such as palladium.

In Examples 1–7 described above, the temperature was 100° C. and the pressure 1500 p. s. i. However, other temperatures may be used, such as 75° C., as shown in Examples 8–11, depending to some extent upon the pressure, but normally temperatures in excess of 120° C. should be avoided. At these elevated temperatures sugars in general have a tendency to decompose. The pressures used in the hydrogenation may be varied considerably.

In Examples 1–7 the time for hydrogenation was 6 hours. Of course it should be realized that any amount of time, sufficient to accomplish the required result, may be used. For example in Examples 8–11 the hydrogenation time was only 2 hours. Thus it is possible that at a pressure of 2000 p. s. i. the time for maximum hydrogenation might be substantially less than 2 hours.

I claim:

1. The process for preparing amino alcohols which comprises reacting an aqueous solution of a compound selected from the group consisting of aliphatic hydroxy aldehydes and aliphatic hydroxy ketones with hydrazine and subsequently hydrogenating the resultant reaction product at a maximum temperature of 120° C.

2. The process for preparing glycamines which comprises reacting an aqueous solution of a reducing sugar with hydrazine and subsequently hydrogenating the resulting reaction product at a maximum temperature of 120° C.

3. The process as claimed in claim 2 in which said initial reaction takes place at substantially room temperature.

4. The process as claimed in claim 2 in which the hydrogenation is effected catalytically with finely divided nickel at a maximum temperature of 120° C.

5. The process for preparing glycamines which comprises reacting an aqueous solution of a reducing sugar with 0.5 to 1.2 molar equivalents of hydrazine and subsequently hydrogenating the resulting reaction product at a maximum temperature of 120° C.

6. The process for preparing glycamines which comprises reacting an aqueous solution of a reducing sugar with about 0.9 to about 1.0 molar equivalent of hydrazine, and subsequently hydrogenating the resulting reaction product at a maximum temperature of 120° C.

7. The process as claimed in claim 5 in which said catalyst is finely divided nickel.

8. The process for preparing glycamines which comprises reacting an aqueous solution of a reducing sugar with about 0.9 to about 1.0 molar equivalent of hydrazine at substantially room temperature, and subsequently catalytically hydrogenating said resulting solution at a temperature not exceeding 120° C.

9. A process for preparing glycamines which comprises reacting an aqueous solution of a reducing saccharide with hydrazine and subsequently hydrogenating the resulting reaction product at a maximum temperature of 120° C.

References Cited in the file of this patent

Pigman: "Chemistry of the Carbohydrates," published by Academic Press (N. Y.), 1948 (pp. 401, 402 and 419 relied on).

Pigman et al.: "Advances in Carbohydrate Chemistry," vol. III (N. Y.), 1948 (pp. 39 and 40 relied on).